United States Patent [19]

Jache et al.

[11] 4,414,302

[45] Nov. 8, 1983

[54] METHOD OF MAKING A LEAD STORAGE BATTERY AND LEAD STORAGE BATTERY MADE ACCORDING TO THIS METHOD

[75] Inventors: Otto Jache; Heinz Schroeder, both of Büdingen, Fed. Rep. of Germany

[73] Assignee: Accumulatoranfabrik Sonnenschein GmbH, Büdingen, Fed. Rep. of Germany

[21] Appl. No.: 315,625

[22] Filed: Oct. 28, 1981

[30] Foreign Application Priority Data

Nov. 6, 1980 [DE] Fed. Rep. of Germany ....... 3041953

[51] Int. Cl.$^3$ .................... H01M 10/12; H01M 10/06
[52] U.S. Cl. .................................... 429/190; 429/204; 429/225
[58] Field of Search ...................... 429/190, 225, 204

[56] References Cited

U.S. PATENT DOCUMENTS

| | | | |
|---|---|---|---|
| 1,634,850 | 7/1927 | Powers | 429/190 |
| 3,172,782 | 3/1965 | Jache | 429/190 X |
| 3,305,396 | 2/1967 | Rauter | 429/190 X |
| 3,457,112 | 7/1969 | Reber | 429/190 X |
| 3,556,860 | 1/1971 | Amlie | 429/190 X |
| 3,711,332 | 1/1973 | Bastacky | 429/190 X |

Primary Examiner—Anthony Skapars
Attorney, Agent, or Firm—Shlesinger, Fitzsimmons & Shlesinger

[57] ABSTRACT

This invention is related to a method of making a lead storage battery with a thixotropic gel as electrolyte consisting substantially of a sulphuric acid and a gelling agent. The object is to provide a lead storage battery which is maintenance free, leak-proof and of a long cycle life while permitting filling of the electrolyte independently of the plate dimensions including the superficial extent of the plate. To achieve this object: (a) the sulphuric acid is electrochemically bonded in the active material of the electrodes; and (b) the gel forming electrolyte is filled into the battery in the form of a gelling agent and a sulphuric acid concentration which is insufficient for the formation of a gel, but which is sufficient for initiating a charging process upon application of a charging voltage. During the charging process the sulfuric acid that is bonded to the electrodes, together with the gel forming electrolyte, will start the formation of the gel.

10 Claims, No Drawings

METHOD OF MAKING A LEAD STORAGE BATTERY AND LEAD STORAGE BATTERY MADE ACCORDING TO THIS METHOD

The invention relates to a method of making a lead storage battery with a thixotropic gel as electrolyte which consists substantially of sulphuric acid and a gelling agent, in accordance with the preamble of claim 1, and to a lead storage battery made in accordance with this method.

Such a lead storage battery with a thixotropic gel as electrolyte has been described, for instance, in the Swiss Pat. No. 391,807. This position-independent storage battery, which is gas-tight in operation and exhibits little self discharge, includes a solid electrolyte which is characterised in that for setting purposes substances have been added thereto which are capable of forming a thixotropic gel, wherein the thixotropy of the electrolyte permits the temporary liquefaction thereof so that it may be filled in. In this connection it is taken for granted that the particles of the gelling agent at the time of filling in, i.e., in the state where a fully formed gel does not yet exist, have already been associated to such an extent as to be no longer able to enter into the pores of the active substance.

In the German Pat. No. 1,671,693 there is described a further rechargeable lead storage battery with a thixotropic gel, which battery on account of the use of antimony-free alloys for the mass carriers of the electrodes also permits maintenance free operation and in addition, due to the simultaneous use of silicic and phosphoric acid in the electrolyte, achieves a high cycle life and thereby a service life which is even longer than that of a comparable lead storage battery equipped with antimony containing mass carriers. For the manufacture of this storage battery dry charged plates are inserted in the cell boxes of the battery, the cell boxes are evacuated, the electrolyte is filled into the cell boxes under vacuum, and subsequently the storage battery is aerated.

However, the lead storage batteries described in the Swiss Pat. No. 391,807 and the German Pat. No. 1,671,693 are suitable for relatively small plate dimensions, in particular small plate surfaces, so that their capacities are restricted to about 20 Ah. This is due to the fact that upon filling-in of the electrolyte, which at the moment of filling-in represents the liquefied form of the thixotropic gel, gel is already formed again in the cell during the filling operation and prevents the flow of the filler electrolyte into more remote areas of the cells. The previously described lead storage batteries both according to the Swiss Pat. No. 391,807 and the German Pat. No. 1,671,693 are unsuitable—especially because of the methods employed for the manufacture thereof—for maintenance free and long-cycle-life lead storage batteries with greater plate dimensions and thus a higher capacity, such as are of special significance for industrial use.

The invention is based on the object of providing a lead storage battery according to the preamble of claim 1 in such a way that it is maintenance free, leak-proof and has a long cycle life while permitting filling of the filler electrolyte independently of the plate dimensions including the superficial extent of the plates.

The above-specified object is solved according to the invention by the features of the characterising part of claim 1. Further embodiments of the invention are represented in the subclaims.

The unique feature of the invention resides in that during filling of the filler electrolyte, which consists of a dilute sulphuric acid and a gelling agent, one does not proceed—as in the subject matter of the German Pat. No. 1,671,693—from a charged battery but from a battery with definedly discharged plates. "Definedly" in this context means that current intensity and time period of the discharge are dimensioned such that thereby sulphuric acid is bonded in the plates to such an extent that an acid concentration will result for the filler electrolyte consisting of dilute sulphuric acid and gelling agent which concentration is still quite sufficient, on the one hand, to freely initiate the process of recharging and, on the other hand, is already sufficient to achieve a partial association of the individual particles of the gelling agent in the filler electrolyte, but which is not sufficient to form a solid gel during the filling operation. The result thereof is that even with extremely small plate spacings and maximum plate dimensions the filler electrolyte may be filled in without additional aids like any normal liquid electrolyte to which no gelling agent is added, while not causing any disturbance of the flow property. The gel formation will start gradually only after initiation of the charging process with the then increasing concentration of sulphuric acid and will take place exclusively outside of the pores of the active substances in the electrolyte. Surprisingly, the pores within the active substances remain free from gel formation—as in the subject matter of the Swiss Pat. No. 391,807 and, respectively, the German Pat. No. 1,671,693—and after the completed recharging of the storage battery they are substantially filled with freely movable gel-free electrolyte.

The combination of these features enables the production of maintenance free leak-proof lead storage batteries with a long cycle life, which permit practically any desired plate dimensions and thus lead storage batteries of practically any desired size with a correspondingly high capacity.

Surprisingly, it was shown that the general misgivings of experts in the field to the effect that storage battery cells of such size with an electrolyte fixed in the form of a gel could not be operated over a longer period of time without unacceptable capacity losses and difficulties upon recharging, did not materialise.

Moreover even with these large dimensions a substantially homogeneous gel resulted while no special mechanophysical methods such as the evacuation of the cell box prior to filling in of the filler electrolyte and the aeration above the filler electrolyte had to be employed. Because of the narrow plate spacings and the large areas this method could no longer be used with longer flow paths. Incidentally, the viscosity and the gel forming speed increase considerably with increasing concentration of gelling agent. On the other hand, a better and more stable gel may be realised by a higher gel concentration. With lead storage batteries having the features of the subject matter of the invention it is thus possible to produce significantly higher concentrations of the gelling agent, for instance of silicic acid, whereas in the method according to the German Pat. No. 1,671,693 a silicic acid content of more than 6.5% could hardly be exceeded.

Thus, the lead storage battery according to the invention also permits the formation of an improved gel. In this connection the performance data and the service life of conventional lead storage batteries have not only been achieved but have even been surpassed in more than one respect.

Moreover, it is possible to make the electrode spacings and, respectively, the spacing between electrodes and separators extremely small. In this way it is possible not only to improve the overall capacity of such storage batteries but also to increase the capacity per volume because of the reduced electrode spacings.

A possible higher gel concentration will have a positive effect both as regards an improved leakproof property and as regards the electrical properties, in particular the cycle life as well as the service life of such lead storage batteries.

According to one embodiment of the invention the electrochemical bonding of the sulphuric acid in the pores of the active substances of the electrodes is effected by filling in a liquid sulphuric acid electrolyte and discharging the battery down to a desired degree. Thereupon the remaining freely movable liquid electrolyte is removed from the battery cells, preferably by being poured out. Then the discharged electrodes are cleaned from electrolyte by washing with washing water and are then dried so as to be free from oxidation.

It will also be possible to mix the free electrolyte removed from the cells of the lead storage battery after discharging with a gelling agent and to fill it in subsequently as filler electrolyte.

After charging, the filled-in filler electrolyte together with the acid released by charging from the pores of the active substances will constitute the working electrolyte, wherein a sulphuric acid concentration is obtained which corresponds to the desired predetermined working acid density.

Advantageously, phosphoric acid, preferably orthophosphoric acid, is added to the filler electrolyte in an amount of from 0.5-15, preferably from 4-6% by weight, based on the sulphuric acid contained in the working electrolyte in the charged condition. Thereby about 20-50 mg of orthophosphoric acid are to be obtained per gram of positive substance.

It has been established by extensive tests—and this could not be foreseen—that the phosphoric acid upon charging of the storage battery will be bonded in the active substance of the positive plate and upon discharging will again be released almost completely into the electrolyte. On the other hand, there are no reactions between the active substance of the negative plates and the phosphoric acid. Due to the surprising fact that the phosphoric acid is bonded in the positive active substances but is released again for incorporation into the gel-like electrolyte, the positive properties of the phosphoric acid, especially the long cycle life, surprisingly become fully effective also with a lead storage battery manufactured in accordance with the principles of the invention.

It should be pointed out that in dependence on the desired application of the lead storage batteries different substance/acid ratios will be required. This results necessarily also in correspondingly differing phosphoric acid concentrations in the electrolyte, which is expressed by the relatively wide range of the amount of phosphorus.

Below, the manufacturing process is to be described in general outline.

The invention commences after completion of the so-called formation, which means the first conversion of the substances incorporated in the electrodes from the previously inactive into the electrochemically active state. In this connection it is immaterial for the claimed method whether the formation has been effected on already finished cells or batteries as a so-called case formation or only on the plates of the battery in special tanks provided for this purpose. Of course, storage batteries which are already charged so as to be ready for use may be employed for performing the method. In all cases the method steps are substantially the same:

1. Effecting a discharging for removing a defined capacity relative to the storage battery or to the individual plate for the purpose of binding a defined amount of sulphuric acid in the plates associated with the storage battery;
2. complete or partial removal of the electrolyte used for the discharging alternatively from the plates and the cell boxes, respectively;
3. filling in of the filler electrolyte which in addition to sulphuric acid contains the total amount of gelling agent, and, if desired, phosphoric acid, into the cells of the prepared storage battery, wherein the sulphuric acid concentration in the filler electrolyte is adjusted such that by the release of the sulphuric acid bonded in the plates it will be brought to the concentration required for the working electrolyte of the storage battery;
4. effecting the recharging of the plates of the storage battery, whereby the gel formation in the electrolyte is effected and after completion of which the sulphuric acid concentration in the electrolyte will be obtained which corresponds to the working acid density of the storage battery.

The discharging performed in the first method step is dimensioned with respect to duration and current intensity such that, proceeding on a regular working acid concentration and a regular volume of working acid within the storage battery, upon interruption of the discharging the weight ratio of the sulphuric acid bonded in the active substances as a sulphate to the sulphuric acid remaining at the end of the discharging as free acid in the electrolyte will be between 1:1 and 50:1, preferably between 2.5:1 and 5:1.

The residual liquid electrolyte remaining after the discharging is again removed in the second method step. The electrodes may be cleaned with washing water from the electrolyte still adhering thereto and may subsequently be dried so as to be free from oxidation, in accordance with a known method. The volume of the remaining electrolyte at the end of the discharging step and the residual sulphuric acid concentration still remaining therein will determine the amount of filler electrolyte to be filled in and the acid concentration to be used therein. The acid concentration in the filler electrolyte may be within a relatively wide range corresponding to an acid density between 1.02 and 1.14. The most favourable working range is obtained at an acid concentration corresponding to a density of 1.05 to 1.08. Preferably, a uniform filler electrolyte is used having a uniform and identical acid concentration for all concerned storage batteries, wherein the amount of sulphate to be stored by discharging for the individual types of storage batteries or battery lines or, respectively, their plates is separately calculated and determined.

In addition to the sulphuric acid the filler electrolyte contains a gelling agent in an amount which, based on the finished working electrolyte, results in concentrations of about 3-15, preferably 7-9% by weight. A suitable gelling agent is finely dispersed silicon dioxide preferably prepared pyrogenically and having a particle size of 0.002–0.1 μm, preferably of 0.01–0.02 μm, and a specific surface of 20–500 m$^2$/g, preferably of 100–300 m$^2$/g. To the filler electrolyte there may further be added orthophosphoric acid in an amount of from 0.5–15, preferably from 4–6% by weight, based on the sulphuric acid contained in the working electrolyte in the charged state, so that about 20–30 mg of orthophosphoric acid will result per gram of active positive substance.

The sulphuric acid concentration in the filler electrolyte is dimensioned such that during the third method step, i.e. the filling, already an association of the particles of the gelling agent will occur which, however, will not result in the formation of a solid gel either during the filling operation or during a rest interval of some hours or days possibly provided prior to the last method step. The gel formation itself will commence gradually with increasing sulphuric acid concentration during the last method step until a uniform electrolyte gel has been obtained in the entire electrolyte space.

In this way it is possible to use electrolytes with solid gels for practically any desired battery dimensions including practically any desired superficial extents. Only thus has it become possible to meet the great demand for absolutely leak-proof, maintenance free and long-cycle-life storage batteries of large size and thus increased capacity. Such storage batteries are required mainly in heavy industry, but they are also of increasing interest in respect of the storage of solar energy, in particular in remote areas of developing countries.

Such storage batteries with solid gels are absolutely leak-proof even in case of serious damage to the box. Consequently, they are particularly harmless to the environment. Below the gassing voltage they may be operated quite maintenance free. There is no loss of water that would have to be replenished. During the gassing-free recharging the undesired lamination of the electrolyte does not occur while it does with liquid electrolytes, thus resulting in different concentrations of the sulphuric acid which must be especially eliminated by charging up to the gassing range.

Advantageously, antimony-free lead alloys or also—if permitted by the design of the electrodes—high-purity lead or dispersion-hardened lead is used for the supporting matrix of the electrodes. Suitable alloying constituents for antimony-free alloys are the alkaline earth metals, preferably calcium; but it is also possible to use alloying metals outside of this group provided they have no, or only an insignificant effect on the hydrogen overvoltage at the negative plate of the lead storage battery, such as mercury, tin or cadmium. Such storage batteries have a very good cycle life and are also insensitive with respect to very extensive discharging. Any usual types of plate construction may be employed, for instance also positive tube-type plates and negative grid plates. Also, it is possible to use any desired types of spacer members.

Embodiments of the invention will be described below:

Example 1 describes a cell with wet discharged positive tube-type plates and negative grid plates, having a nominal capacity of 210 Ah.

Example 2 describes a cell with dry discharged positive tube-type plates and negative grid plates, having a nominal capacity of 1750 Ah.

EXAMPLE 1

Example 1 is based on a cell for industrial batteries which is usual as regards capacity and dimensions, such as will be used for driving electrically activated vehicles, for instance electric trucks, electric fork lifters etc. The cell box is made of polypropylene and is closed by a welded cell lid of the same material. The electrical terminals are led through the cell lid to the outside in an electrolyte-tight manner. Looking at the internal structure of the cell, the positive electrode comprises three single plates welded via a cell connector to the cell terminal to form an integral unit. The negative electrode is of analogous structure and comprises four single plates. Commonly used electrolyte-permeable separators are disposed between the alternately registering opposite plates of different polarity.

Having regard to the type of the positive electrode, this comprises 19-part tube-type plates having an overall length of 315 mm. On the other hand, the negative electrode consists of grid plates. The supporting matrix of the positive and of the negative electrode plates consists of an antimony-free lead alloy. With an overall height of 400 mm, a width of 200 mm and an overall length of 65 mm corresponding to the number of plates, and a nominal voltage of 2 V, the cell has a nominal capacity of 210 Ah with a discharge time of 5 hours.

For the purposes of this example the cell was made operative in accordance with the prior art by filling with dilute sulphuric acid and subsequent charging. In this connection it is immaterial for the example whether for the setting into operation the cell was equipped with plates already charged in dry state or with non-activated plates so that the setting into operation at the same constitutes the activation of the plates within the cell box. The acid volume of the cell when set into operation and thus being ready for use is 2.5 liters, the nominal acid density is 1.27 kg/liter.

For converting the liquid electrolyte consisting of dilute sulphuric acid into a gel the cell, subsequently to the preceding setting into operation, is subjected to discharging with the 20-hour current $I_{20} = 12.5$ A down to a consumption of 250 Ah. During this time the acid density decreases to a final value of 1.06 kg/liter. The amount of sulphuric acid corresponding to the withdrawn capacity is bonded in the electrodes in the form of lead sulphate which is inactive with respect to the gel formation.

When the discharging is completed the electrolyte freely movable within the cell is removed therefrom by dumping. The volume of the electrolyte collected in a vessel is 1.40 liters. The rest of the electrolyte will remain in the pores of the positive and negative active substances of the electrodes and separators.

204 g of a pyrogenically prepared silicic acid (AEROSIL 200) having an average particle size of 12 millimicrons are added to the electrolyte removed from the cell. The silicic acid content amounts to about 12% by weight, based on the total weight of the electrolyte available for being filled in again.

To improve the cycle life, phosphoric acid may further be added to the electrolyte removed from the cell. The amount of added orthophosphoric acid must be based on the total volume of the electrolyte contained in the cell set into operation. Advantageously, 76.5 g of an 85% orthophosphoric acid are added. With a total volume of 2.5 liters this corresponds to about 25.5 g of $H_3PO_4$/liter or respectively, based on the weight of the electrolyte in the charged condition of the cell, to about 2%.

Suitably, the phosphoric acid is added before the silicic acid. Advantageously, the added silicic acid is admixed to the electrolyte by means of a high-power dispersing device in accordance with the stator-rotor system at a rotational speed of up to 10,000 r.p.m. This ensures that the silicic acid is mainly present in the form of primary particles in the liquid and may thus contribute only insignificantly towards increasing the viscosity. Immediately after stirring the delivery time in the delivery beaker according to DIN 53211 is 50 s for the 2 mm nozzle as compared to 47 s in case of an electrolyte completely free from silicic acid. The time of processibility is at least 60 minutes. Only then will the association of the individual particles with each other through hydrogen bridges commence, which is apparent from the viscosity increase but which cannot yet result in the complete formation of a gel due to the insufficient acid concentration. By reemployment of the above described stirring system the silicic acid containing electrolyte on account of its thixotropy may always be returned into the original liquid state within a very short time. The thus liquefied silicic acid containing electrolyte may be filled into the cell like an electrolyte free from silicic acid and may be reused again and again.

Even minute inclusions of air or gas bubbles may rise freely so that a completely homogeneous filling of the used cell space is ensured. It has even been proved to be advantageous prior to connecting the cell for recharging and the thus initiated formation of the gel due to the increase in sulphuric acid concentration, to place the cell for about 24 h in an open circuit in order to achieve a more intensive exchange between the filled-in electrolyte and the residual electrolyte remaining in the pores and thus an even better anchoring of the gel in the outer pore region of the active substances. In this connection the residence time may even be extended further. Even after 24 hours the electrolyte between the electrodes is still liquid and freely movable.

When the charging current is turned on and the electrodes are returned to the charged condition and consequently the sulphuric acid bonded in the electrodes is progressively released, the gel formation will commence with increasing acid concentration in the electrolyte and will be practically completed when the withdrawn capacity has been recharged.

EXAMPLE 2

Example 2 is based on a cell for industrial batteries improved with respect to capacity but usual as regards the dimensions of the cell; such cells are used for charge retention or for stand-by parallel operation in stationary systems. The cell box consists of SAN (acrylonitrile-styrene polymer) and is closed by a cell cover of the same material adhesively fastened to the cell box. The electrical leads are passed through the cell cover so as to be electrolyte-tight. Looking at the internal structure of the cell, the positive electrode consists of 14 single plates welded via a cell connector to the cell terminal so as to form a unit. The negative electrode has analogous structure and consists of 15 single plates. Separators which serve as spacer members insulate the alternatingly registering opposing plates of different polarity.

Having regard to the type of the positive electrode, this is comprised of 19-part tube-type plates having an overall length of 555 mm, whereas the negative electrode is of the grid-plate type. The supporting matrix of the positive and of the negative electrode plates consists of an antimony-free lead alloy. With an overall height of 800 mm, a cell width of 212 mm and an overall length of 277 mm corresponding to the number of plates, and with a nominal voltage of 2 V, the cell has a nominal capacity of 1750 Ah with a discharge time of 10 hours.

For the purposes of this example the cell is equipped with dry, discharged electrodes. The setting into operation takes place directly by means of an already silicic acid containing filler electrolyte and subsequent recharging of the electrodes.

For the preparation of such cells individual plates are activated in separate jars in accordance with common practice, wherein the number of plates and the size of the jars need not correspond to the cell to be used later.

The discharging of the individual plates in accordance with their capacity, which is necessary for bonding the sulphuric acid, is effected immediately following the activation in the activating jars. In this connection the discharging current must be matched with the number of plates installed in the jar. After the discharging has been completed the plates are removed and dried in accordance with a known method, wherein the capacity losses due to drying are to be minimised. It is therefore recommended to dry the negative plates by excluding atmospheric oxygen. After the drying process the plates are ready for the assembly of cells.

For purposes of the present example the plates of a cell, following the previous activation, were subjected to discharging with the 20-hour current $I_{20}=101$ A down to a consumption of 2020 Ah. Thereby the following bonding occurred in the plates:

$$2020\ Ah \times 3.66\ g/Ah\ H_2SO_4 = 7393\ g\ H_2SO_4/cell.$$

The required total amount of sulphuric acid for a cell is 19.2 liters at a nominal acid density of $d_{20}=1.280$. A sulphuric acid having the aforementioned density contains 478 g of $H_2SO_4$ per liter, thus resulting in an amount of 9180 g of $H_2SO_4$ for the entire cell. Subtracting therefrom the sulphuric acid bonded in the plates amounting to 7393 g, there results a sulphuric acid requirement for the filler acid amounting to 1787 g of $H_2SO_4$. Considering the filling volume of 19.2 liters, there results from the previously calculated required amount a sulphuric acid concentration of 93.07 g of $H_2SO_4$/liter, which corresponds to a density of $d_{20}=1.058$.

In accordance with the preceding calculation an amount of 1.6 kg of a pyrogenically prepared silicic acid (AEROSIL 200) having an average particle size of 12 millimicrons was added to 19.2 liters of sulphuric acid having a density rounded up to 1.06. The silicic acid content is about 7.3%, based on the filler electrolyte.

Orthophosphoric acid was not added because the here concerned test cell is not intended for cycle operation.

As in the first test, the added silicic acid was admixed to the electrolyte by means of a high-power dispersing device in accordance with the stator-rotor system, so that immediately after the stirring operation the silicic acid again was dispersed in the liquid in the form of its primary particles.

The delivery time in the Ford beaker immediately after stirring was 50 s. While with the filler electrolyte of the first example, after it had been left to stand quiescent for one hour, the delivery time increased to 70 s as a measure of the increase in viscosity, the filler electrolyte of the present second test exhibited a delivery time of only 54 s after a waiting time of one hour. After a residence time of 24 h the electrolyte filled into the cell was still freely movable.

When the charging current is turned on, the electrodes are returned to the charged condition, and the sulphuric acid bonded in the electrodes is consequently released progressively, this example also exhibits gel formation with increasing acid concentration in the electrolyte, and this is practically completed when the recharging to full capacity is completed. The silicic acid concentration of the gelated electrolyte between the electrodes amounts to about 10.5% due to the extraction of liquid by the electrodes and due to the fact that no significant amounts of silicic acid can enter into the electrodes.

After a preparatory 10-hours' and a 5-hours' discharging with corresponding recharging the following capacities were measured at the cells according to example 2:

TABLE

| $I_t Q$ A | h | Ah |
| --- | --- | --- |
| 250 | 6.60 | 1650 |
| 150 | 11.74 | 1761 |
| 75 | 26.44 | 1983 |
| 50 | 40.72 | 2036 |
| 16 | 135.37 | 2166 |

It will be apparent from this table that the nominal capacity of 1750 Ah is satisfied with a 10-hour discharging.

What we claim is:

1. A method of making a lead storage battery with a thixotropic gel electrolyte consisting substantially of sulphuric acid and a gelling agent, and characterized in (a) that sulphuric acid is electrochemically bonded in the active material of the electrodes in the battery, and (b) that the battery thereafter is filled with a gelling agent and a sulphuric acid the concentration of which is insufficient for the formation of a gel, but which is sufficient for initiating a charging process upon application of a voltage.

2. A method according to claim 1, characterized in that the electrochemical bonding of sulphuric acid occurs in the pores of the active material of the battery electrodes, and is effected by discharging the lead storage battery while it is filled with a liquid sulphuric acid electrolyte, and that subsequently the residual liquid electrolyte, which is not bonded in the pores of the active material of the electrodes, is removed from the battery.

3. A method according to claim 2, characterised in that the residual electrolyte is washed from the discharged electrodes and subsequently the electrodes are dried in a non-oxidising manner.

4. A method according to claim 2, characterised in that the residual liquid electrolyte, after its removal from the battery, is mixed with a gelling agent and subsequently is returned to the battery as the gel forming electrolyte.

5. A method according to claim 4, characterised in that after the filling the battery with the gel forming electrolyte a charging voltage is applied to the electrodes so that the electrochemically bonded sulphuric acid will be released from the active material of the electrodes and together with the sulphuric acid contained in the gel forming electrolyte will result in a working electrolyte having a sulphuric acid concentration which corresponds to a predetermined working acid density, and which after being supplied with a predetermined electrical charge will progressively form a gel.

6. A method according to any one of claims 1 to 3, characterised in that to the gel forming electrolyte there is added phosphoric acid, for example orthophosphoric acid in an amount of from 0.5 to 15% by weight, based on the sulphuric acid contained in the working electrolyte in its charged condition, so that about 20 to 50 mg of orthophosphoric acid will result per each gram of active material of the electrodes.

7. A lead storage battery with a thixotropic gel electrolyte, which consists substantially of sulphuric acid and a gelling agent, made in accordance with the method claimed in claim 5, characterised by
  (a) a partial electrochemical bonding of a liquid electrolyte in the pores of the active material of the electrodes, in which the weight ratio of the acid bonded as a sulphate in said active material, to the residual free acid remaining in the liquid electrolyte after said discharging of the battery, is between 1:1 and 50:1, and
  (b) said gelling agent in the finished working electrolyte amounts to about 3 to 15% by weight.

8. A lead storage battery according to claim 7, characterised in that finely dispersed silicon dioxide is used as the gelling agent.

9. A lead storage battery according to claim 8, characterized in that the silicon dioxide has a particle size of 0.002 to 0.1 $\mu$m, preferably of 0.01 to 0.02 $\mu$m, and a specific surface of 20 to 500 m$^2$/g, preferably of 100 to 300 m$^2$/g.

10. A lead storage battery according to any one of the claims 7 to 9, characterised in that the active material is applied to electrode substrates consisting of high-purity lead, dispersion-hardened lead, or of antimony-free lead alloys including lead-hardening substances such as selected from the group consisting of calcium, cadmium, and alkaline earth metals.

* * * * *